UNITED STATES PATENT OFFICE.

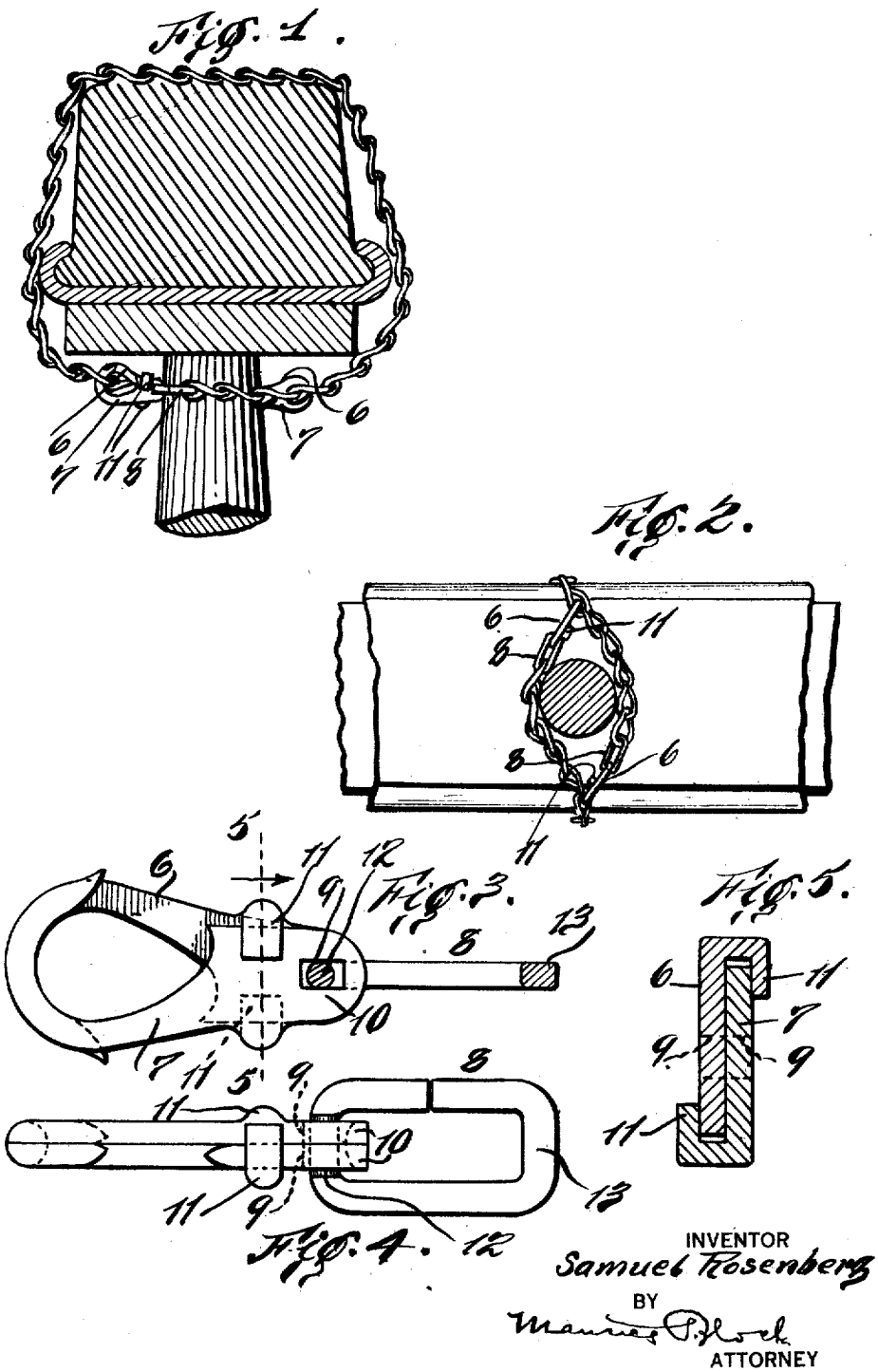

SAMUEL ROSENBERG, OF NEW YORK, N. Y., ASSIGNOR TO NATIONAL CHAIN COMPANY, OF COLLEGE POINT, NEW YORK, A CORPORATION OF NEW YORK.

CHAIN-FASTENING.

1,267,119.   Specification of Letters Patent.   Patented May 21, 1918.

Application filed December 20, 1917. Serial No. 208,020.

*To all whom it may concern:*

Be it known that I, SAMUEL ROSENBERG, a citizen of the United States of America, residing at New York city, Bronx county, State of New York, have invented certain new and useful Improvements in Chain-Fastening Means, of which the following is a full, clear, and exact description.

This invention relates to improvements in chain fastening means or couplings, the object of the invention being to provide a fastener or coupling arranged to connect chains or to secure same to other elements. My improved fastener or coupling is arranged so that it will become locked against premature opening by virtue of its construction or the arrangement of the elements constituting same when said elements are properly manipulated.

I will now proceed to describe my invention in detail, the novel features of which will be pointed out in the appended claims, reference being had to the accompanying drawing, forming part hereof, wherein:—

Figure 1 is a sectional view illustrating my improvement as applied to a tire-chain;

Fig. 2 is a bottom plan view thereof on a reduced scale;

Fig. 3 is an enlarged side view of my improved fastener or coupling;

Fig. 4 is a top plan view thereof; and

Fig. 5 is a cross sectional view, the section being taken on a line 5—5 in Fig. 3.

While I have illustrated my improved fastener, or coupling as applied to a tire-chain, I wish it understood that it is not limited to such use, my improved fastener being designed for use in connection with any open link chain for any purpose whatsoever.

Referring now to my improved fastener or coupling, it consists of a plurality of (in this instance) overlapping hook-members 6 and 7, pivotally connected at one end by a link 8 or locked against pivotal movement by the same link. Whether the hook-members can be moved radially, relatively to each other, or not depends upon the position of the link 8 relatively to the openings 9 adjacent the end 10 of each hook-member 6 and 7. In this instance the openings 9 have been illustrated as square, but openings of any desirable configuration, accomplishing the same result, may be employed. To prevent sidewise movement or separation, each hook-member 6 and 7 is provided with a lip 11 which overhangs the adjacent hook-member as illustrated in Fig. 5.

As can be seen in Fig. 3, the link 8 has one of its ends rounded as at 12, while the other end 13 is square, in this instance. As the end 13 of the link acts in coöperation with the openings 9 to lock the hook-members against pivotal movement or separation, the configuration of the said end 13 will correspond to the configuration of the alined openings 9 in the said hook-members 6 and 7. As the end 12 of the said link 8 acts as a pivot or trunnion for the hook-members, it will be preferably made cylindrical or round regardless of the configuration of the alined openings 9.

When the elements are relatively positioned as indicated in Fig. 3, the hook-members 6 and 7 can be radially separated in order that the hook-members can be caused to engage a link of the chain to which the fastener is applied, or to any suitable anchorage. After the hook-members have been closed upon the anchorage selected, the link 8 will be reversed to cause the squared end 13 (in this instance) to become positioned in the alined openings 9, after which the hook-members 6 and 7 will be locked against premature radial separation. The link 8 will preferably be made split in order that it can be opened to release the chain from its anchorage, should for any reason the hook-members become jammed or bent out of shape by a heavy blow. If desirable, however, the link can be made solid.

What I claim as my invention is:

1. A chain-fastener or coupling, consisting of a plurality of pivotally connected hook-members, said hook-members being provided with alining square openings, and a link reversibly engaging said hook-members and passing through said openings, one end of said link being squared to correspond to the configuration of the said openings, the opposite end of said link being rounded.

2. A chain-fastener or coupling, consisting of a plurality of pivotally connected hook-members, said hook-members being provided with alining square openings, a link reversibly engaging said hook-members and passing through said openings, one end of said link being squared to correspond to the configuration of the said openings, the opposite end of said link being rounded, and a lip carried by each hook-member arranged to overhang the adjacent hook-member to prevent sidewise separation of said hook-members.

3. A chain-fastener or coupling, consisting of a plurality of hook-members, and a link reversibly associated with said hook-members arranged at one of its ends to pivotally connect said hook-members and permit the radial separation thereof, the opposite end of said link being arranged to prevent the radial separation of said hook-members.

4. A chain-fastener or coupling, consisting of a plurality of hook-members, and means to pivotally connect same, said connecting means also constituting a lock for said hook-members.

5. A chain-fastener or coupling, consisting of a plurality of pivotally associated hook-members, guards to prevent the sidewise separation of the hook-members, a trunnion independent of the said guards, and a locking element for the hook-members associated with the said trunnion.

Signed at New York city, N. Y., this 18 day of December, 1917.

SAMUEL ROSENBERG.

Witnesses:
MAURICE BLOCK,
EDWARD A. JARVIS.

Copies of this patent may be obtained for five cents each, by addressing the "Commissioner of Patents, Washington, D. C."